3,409,705
PROCESS FOR PREPARING BIPHASE PLASTICS
Donald J. Shields and James M. Hawkins, Kingsport, Tenn., assignors to Eastman Kodak Company, Rochester, N.Y., a corporation of New Jersey
No Drawing. Filed Dec. 4, 1963, Ser. No. 328,057
3 Claims. (Cl. 260—880)

ABSTRACT OF THE DISCLOSURE

Biphase plastics are disclosed having a desirable combination of properties including toughness and melt flow. The continuous phase resin should have an inherent viscosity of about 0.5 to 0.7 and the degree of graft should be greater than 12%. A process is described for preparing such biphase plastics by polymerizing at least one ethylenically unsaturated monomer with a rubber suspension employing a catalyst comprising thioglycolic acid and a peroxygen compound. The examples disclose polymerizing styrene and acrylonitrile with polybutadiene using hydrogen peroxide and thioglycolic acid.

---

This invention is concerned with improved biphase plastics having superior physical properties, and with a method for preparing the same. More specifically, this invention is concerned with a new method for obtaining a proper degree of graft of copolymers such as styrene-acrylonitrile onto dispersed rubbers such as polybutadiene to give biphase plastics having superior toughness and superior flow.

A biphase plastic is a mixture of a continuous phase resin (backbone) and an elastomeric polymer (disperse phase) dispersed in the resin as fine particles. The resin ordinarily comprises about three quarters of the final product and primarily determines the physical and chemical characteristics of the biphase plastic. The rubber, through its ability to absorb the energy encountered in sharp blows, can increase toughness and desirably alter other characteristics of the backbone resin provided that the resin becomes "interacted" with the rubber. In other words, although the rubber must be present in the plastic as a separate phase, there must also be some degree of chemical or physical attraction between the two phases before effective reinforcement can occur.

Many commercial applications of biphase plastics require a proper balance of melt flow and toughness properties. Good melt flow is of considerable importance in low temperature, short cycle molding operations which are desirable from the standpoint of polymer color stability as well as economics, and proper toughness is critical for uses wherein the plastic is subjected to physical shock. It has been determined that for such properties to exist, the inherent viscosity of the backbone (continuous phase resin) should be between about 0.5 and 0.7, and the degree of graft—interaction of the backbone resin with the disperse phase rubber—should be greater than about 12%. The backbone I.V. is readily determined from the acetone soluble portion of the final biphase product, and the degree of graft is determined according to the equation:

$$\text{Percent degree of graft} = 100 \frac{(x-y)}{y}$$

where $x=$ the weight of acetone insoluble material in the grafted product, and $y=$ the weight of acetone insoluble material in the same amount of rubber and continuous phase resin as exists in the biphase product but which are produced in isolated form without grafting for purposes of making this calculation.

In actual practice, this balance of properties is very difficult to obtain, because ordinary catalyst systems give backbone I.V.'s well over 1.0, and polymers having I.V.'s in this range have very poor flow properties. In ordinary vinyl polymerizations, the I.V. of the polymer produced can be lowered by increasing the concentration of catalyst and/or activator, by raising the temperature of polymerization, by increasing the solvent/monomers ratio, or by using a material that has chain transfer activity. Usually, the latter method, use of a chain transfer agent, is preferred. We have found in our system, however, that almost without exception the techniques listed above for lowering polymer I.V. also lower the degree of graft well below 12%, and low I.V. (0.5–0.7) polymers made using the above techniques had low (below 10%) degrees of graft and very poor impact properties. In particular, low I.V. polymers made using chain transfer agents such as tertiary dodecyl mercaptan had very low degrees of graft and were brittle.

Objects of the present invention therefore are: to provide tough and easily processable biphase plastics; and to provide a commercially attractive process for preparing the same.

These and other objects have been attained through the discovery that when the polymerization of the continuous phase monomers is carried out either batchwise or continuously in the presence of a suspension of rubber, employing one or more water soluble peroxy compounds and thioglycolic acid as the catalyst system, the resultant backbone I.V. and degree of graft are within the aforesaid ranges rendering the biphase plastic tough and easily processable. The weight ratio of the thioglycolic acid to $H_2O_2$ may be varied between about 0.05/1 to 1/1, with 0.2/1 to 0.4/1 being preferred for most polymerizations. The preferred concentration of catalyst is between about 0.5 to about 2.0% by weight of the total monomer although other concentrations may be employed depending on the desired speed, etc. of the reaction.

Although the examples given below are drawn to the graft polymerization of styrene and acrylonitrile on polybutadiene, any one or all of these three components can be replaced by other rubbers or vinyl monomers or, for example, styrene alone can be used for the continuous phase resin. The temperature of polymerization is not critical, although for reasons of color stability it is advantageous to operate at low temperatures. Also, the surfactants, dilution, pH, etc., although they may affect certain properties, are not critical. If desired, other chain transfer agents or catalyst activators, if present in low enough concentrations so that they do not lower the degree of graft below the critical value, can be used along with the thioglycolic acid. Suitable peroxy compounds include the persulfates, perborates or percarbonates of Na, K or $NH_4$.

Among the many rubbers useful in the present invention are polybutadiene, polyisoprene, and copolymers of butadiene or isoprene with styrene, acrylonitrile, α-methyl styrene, methacrylonitrile, and the like. The suspensions of these materials are conveniently prepared by polymerizing or copolymerizing the monomers in the presence of suitable surfactants and peroxidic catalyst. Butyl rubber suspension prepared by dispersing preformed butyl rubber in water by appropriate surfactants, and various ethylene-propylene copolymer rubbers in suspension form may also be used.

The term suspension as used herein refers to suspensoid sols containing rubbery particles of from about 0.015 to about 0.500 micron average diameter dispersed by polar molecules absorbed thereon at their hydrophobic ends. Such molecules known as surfactants or emulsifiers in the polymer art are very numerous and may be represented by sodium stearate, Igepal CO-850 [nonylphenoxypoly(ethyleneoxy)ethanol], and Aersol OT (dioctyl ester of sodium sulfosuccinic acid). For an extensive list of emulsifiers see Detergents & Emulsifiers, 1962, John W. McCutcheon, Inc., 236 Mount Kemble Ave., Morristown, N.J The term suspension as used herein also refers to particulate rubbery polymers dispersed by other means including: non-ionic surfactants, e.g., the reaction product of stearyl alcohol and excess ethylene oxide; the natural tendency of the fine particulate polymers to remain suspended for a practical period of time; and agitation of a mixture of the particulate polymer in liquid. In this regard, it may be generally stated that the manner in which the suspension is formed and maintained is not critical to the present invention since it is the disperse condition of the rubbery particles which is important and not the method of getting them in such condition.

Similarly, the particle size does not limit the utility of the invention and mainly affects the characteristics of the final biphase product. However, particles of above-an-average diameter of about 10 microns are not desirable since there will be fewer particles for a given amount of rubber which will provide more opportunity for a growing crack to bypass the shock-absorbing rubber particle. The preferred range of particle sizes ranges from average diameters of about 0.1 to about 2.0 microns, with smaller particles either losing their identity (discreteness) as particles or being too small to absorb the energy of a propagating shock wave. The preferred latices are suspensions in water of particulate rubbery polymers having an average particle diameter in the range of from about 0.1 to about 2.0 microns.

The monomer or monomers for the continuous phase resin may be selected from a wide variety of polymerizable materials possessing either of the following types of unsaturating: $CH_2=C<;>C=C<;$ and

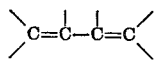

Such materials are comprehensively listed in U.S. Patent 2,396,785. The preferred monomers, however, are those selected from the group consisting of styrene, acrylonitrile, α-methyl styrene, methacrylonitrile, and methyl methacrylate.

This invention can be further illustrated by the following examples of preferred embodiments thereof although it will be understood that these examples are included merely for purposes of illustration and are not intended to limit the scope of the invention unless otherwise specifically indicated.

The following examples further illustrate the invention:

Example 1

This example illustrates the use of thioglycolic acid and hydrogen peroxide in a continuous system to give a biphase plastic having superior toughness and flow. The following polymerization recipe was used.

| Reagent: | Parts |
|---|---|
| Polybutadiene | 20 |
| Styrene | 75 |
| Acrylonitrile | 25 |
| Thioglycolic acid | 0.2 |
| Aersol OT | 3.0 |
| Igepal CO-850 | 1.0 |
| Phosphoric acid | 0.08 |
| Hydrogen peroxide | 0.8 |
| Water | 700 |

The reagents were combined in separate feed tanks as follows.

Feed No.:
1 _____ Water, polybutadiene, and Igepal CO-850.
2 _____ Styrene, acrylonitrile, and Aersol OT.
3 _____ Thioglycolic acid.
4 _____ Phosphoric acid and hydrogen peroxide.

These reagents were fed simultaneously into a one-stage reactor at such a rate that the contact time was 3 hours. The polymerization was held at 60° C. After equilibrium between the product and monomer concentration in the reactor had been reached (12-18 hours) the material was collected continuously and was stabilized with 1% of a Naugawhite/Polygard stabilizer mixture. The emulsion was coagulated at 70° C. with an acidified salt solution and after 4 washes with water was dried in a rotating vacuum dryer. The product after molding under standard conditions had a Rockwell hardness of 100, a melt flow rating of 3.0, and a notched Izod impact value at 73° F. of 6.5.

Example 2

This example shows that when enough tertiary dodecyl mercaptan is used to give a product having satisfactory flow, it has poor toughness. The recipe of Example 1 was used except that 0.7 part of tertiary dodecyl mercaptan replaced the 0.2 part of thioglycolic acid. The product after molding under standard conditions had a Rockwell hardness of 100, a melt flow rating of 2.8, and a notched Izod impact value at 73° F. of 1.5.

Example 3

This example shows that when a low enough concentration of tertiary dodecyl mercaptan to give good toughness is used, a product having very poor flow properties results. The recipe of Example 1 was used except that 0.1 part of tertiary dodecyl mercaptan replaced the 0.2 part of thioglycolic acid. The product after molding under standard conditions had a Rockwell hardness of 99, a melt flow rate of 0.01, and a notched Izod impact value at 73° F. of 4.2.

Example 4

This example shows that when catalyst activators such as bisulfite are used, products having an undesirable combination of properties are obtained. The recipe of Example 1 was used except that 0.5 part of sodium metabisulfite replaced the 0.2 part of thioglycolic acid. The product after molding under standard conditions had a Rockwell hardness of 91, a melt flow rating of .5, a notched Izod impact of .9, and poor color stability. It was not a commercially attractive biphase plastic.

Examples 5 and 6 by comparison show that the thioglycolic acid-hydrogen peroxide catalyst gives superior results to the tertiary dodecyl mercaptan-hydrogen peroxide in 35° C. batch polymerization recipes.

Example 5

The same concentrations of reagents as described in Example 1 were used except that 0.5 part of TGA was employed. The water and phosphoric acid were placed in a batch reactor and were bubbled with nitrogen for 5 minutes. Igepal, polybutadiene latex, and styrene and acrylonitrile containing Aerosol OT dissolved therein were added to the reactor with agitation and under a blanket of nitrogen. The temperature was raised to 35° C., and the hydrogen peroxide, followed immediately by the thioglycolic acid, was added. The reactor was sealed and the reactants were stirred under nitrogen for 9 hours. The product, after stabilization with 1% of a phenolic-phosphite stabilizer, was coagulated with acidified salt and was isolated by filtration. After washing it was dried, rolled, pelletized, and injection molded into test specimens under standard conditions. It had a Rockwell hardness of 99, a melt flow rating of 1.0, and a notched Izod impact of 5.0.

Example 6

This process was carried out in the same manner as Example 5 except that 0.5 part of tertiary dodecyl mercaptan was used in place of 0.5 part of thioglycolic acid.

A product having a Rockwell hardness of 97, a melt flow rating of .7, and a notched Izod value at 73° of 1.5 was obtained.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. A process for the preparation of biphase plastics having an I.V. of about 0.5 to about 0.7 and having a degree of graft of at least about 12% to yield a product characterized by excellent toughness and processability comprising polymerizing at least one material selected from the group consisting of styrene, acrylonitrile, α-methyl styrene and methacrylonitrile, in the presence of an aqueous rubber suspension of at least one material selected from the group consisting of polybutadiene and polyisoprene and a catalyst comprising thioglycolic acid and hydrogen peroxide in a weight ratio of from about 0.05/1 to 1/1.

2. A process for the preparation of biphase plastics having an I.V. of about 0.5 to about 0.7 and having a degree of graft of at least about 12% to yield a product characterized by excellent toughness and processability comprising polymerizing styrene and acrylonitrile in the presence of an aqueous polybutadiene suspension and a catalyst comprising thioglycolic acid and hydrogen peroxide in a weight ratio of from about 0.05/1 to 1/1.

3. A process for the preparation of biphase plastics having an I.V. of about 0.5 to about 0.7 and having a degree of graft of at least about 12% to yield a product characterized by excellent toughness and processability comprising polymerizing styrene and acrylonitrile in the presence of an aqueous polybutadiene suspension and a catalyst comprising thioglycolic acid and hydrogen peroxide in a weight ratio of from about 0.2/1 to 0.4/1.

References Cited
UNITED STATES PATENTS

| | | | |
|---|---|---|---|
| 2,688,008 | 8/1954 | Chaney et al. | 260—895 |
| 2,857,360 | 10/1958 | Feuer | 260—880 |
| 3,062,777 | 11/1962 | Allen et al. | 260—880 |
| 3,168,593 | 2/1965 | Fremon et al. | 260—880 |

OTHER REFERENCES

Snyder et al., Journ. Amer. Chem. Soc., vol. 68, pp. 1422–1428, August 1946.

GEORGE F. LESMES, *Primary Examiner.*